US006344851B1

United States Patent
Roberts et al.

(10) Patent No.: US 6,344,851 B1
(45) Date of Patent: Feb. 5, 2002

(54) METHOD AND SYSTEM FOR WEBSITE OVERVIEW

(75) Inventors: Jobe L. W. Roberts; Michel A. Brisebois, both of Wakefield (CA)

(73) Assignee: Northern Telecom Limited (CA)

( * ) Notice: Subject to any disclaimer, the term of this patent is extended or adjusted under 35 U.S.C. 154(b) by 0 days.

(21) Appl. No.: 09/201,875

(22) Filed: Nov. 30, 1998

(51) Int. Cl.⁷ .............................................. G06T 17/00
(52) U.S. Cl. ...................................................... 345/418
(58) Field of Search ................................ 345/418, 419, 345/433, 434

(56) References Cited

U.S. PATENT DOCUMENTS

| | | | |
|---|---|---|---|
| 5,625,781 A | 4/1997 | Cline et al. | |
| 5,801,702 A | 9/1998 | Dolan et al. | |
| 6,052,669 A | * 4/2000 | Smith et al. | ................... 705/26 |

FOREIGN PATENT DOCUMENTS

| | | |
|---|---|---|
| WO | 97 38389 A | 10/1997 |
| WO | 98 33127 | 7/1998 |

* cited by examiner

*Primary Examiner*—Cliff N. Vo
(74) *Attorney, Agent, or Firm*—Finnegan, Henderson, Farabow, Garrett & Dunner, L.L.P.

(57) ABSTRACT

Methods and systems consistent with the present invention display an overview of a first set of data that resides on a first server, where the first server includes a set of instructions and associated elements, for example multimedia elements, for displaying the first set of data on a display device. A web browser retrieves the set of instructions from the first server such that the associated elements remain un-retrieved by the web browser, and identifies a first set of links that link the first set of data to one another. The web browser then displays an overview, which includes a representation of the first set of data, using, for example, icons. Furthermore, the web browser identifies a second set of links that link one or more of the first set of data to a second set of data that resides on a second server, identifies electronic mail addresses that are included in the first set of data, and identifies the last modification dates associated with the first set of data. In addition, the web browser displays a listing of the first set of data organized according to the identified last modification dates, and a listing of the identified second set of links and electronic mail addresses.

17 Claims, 10 Drawing Sheets

FIG. 7C ALTERNATIVE HIERARCHY VIEW "3D" OR "SPECIAL"

FIG. 7B ALTERNATIVE HIERARCHY VIEW "CARDS" OR "STACKS"

FIG. 7A ALTERNATIVE HIERARCHY VIEW "SPOKES" OR "RADIATING"

INTERNAL E-MAIL ADDRESSES:
JOHN@DISNEY.COM -REF. PAGE
SHEILA@DISNEY.COM -REF. PAGE
ADMIN@DISNEY.COM -REF. PAGE
WEBMASTER@DISNEY.COM -REF. PAGE

NUMBER OF EXTERNAL LINKS: 45
CLICK HERE TO VIEW LINKS
NUMBER OF GRAPHIC ELEMENTS: 350
CLICK HERE TO VIEW LIST OF NAMES
NUMBER OF WEBPAGES: 75
NUMBER OF CROSS LINKS: 24

SEARCH KEY WORD: ☐

*FIG. 10*

METHOD AND SYSTEM FOR WEBSITE OVERVIEW

TECHNICAL FIELD

The present invention generally relates to websites, and more particularly, to a method and system for displaying an overview of the webpages and related information residing in a website.

BACKGROUND OF THE ART

Existing websites on the Internet generally do not provide an overview of the structure of the websites. As a result, users must search for desired information in a website by either using the search facilities provided by the website or by manually searching through the individual webpages in the websites. Often, users have to sequentially bring up several webpages in a website in order to follow the internal links of the website to a desired webpage residing in the website.

Although some website home pages present information in an easily accessible and structured fashion, the specific presentation methods vary widely from website to website without any consistency, and thus, leave users uncertain as to what types of information the websites generally maintain. Even when a user knows in advance that a website contains certain types of information, the website may not present to the user a road map on how to directly access that information from a given webpage in the website, and thus, requiring the user to search through the entire website.

Searching through a website, however, can be time consuming. To display a webpage, a web browser program running on, for example, a personal computer must first download from a website a set instructions for displaying a webpage. These instructions, which are typically in a Hypertext Markup Language (HTML) format, are stored in the website in a separate file, which is referred to as an HTML file. The web browser parses the HTML file, which typically includes 1 to 2 kilobytes of information, and identifies the multimedia elements, for example Java Applets, graphic files, audio files, or movie files, referenced in the HTML file. The web browser then downloads the identified multimedia elements, each of which typically includes 100 to 2000 kilobytes of information. Based on the downloaded multimedia elements and the HTML file, the web browser program can then display the webpage. Because of the large size of the multimedia elements, the downloading process can take significant amount of time, especially when a user has to bring up several webpages to reach a desired webpage.

Thus, it is desirable to have a method and system for providing an overview of the webpages in a website and related information about the website, which address the above and other disadvantages of the prior art.

DISCLOSURE OF THE INVENTION

Methods and systems consistent with the present invention display an overview of a first set of data that resides on a first server, where the first server includes a set of instructions and associated elements, for example multimedia elements, for displaying the first set of data on a display device. In accordance with an embodiment of the invention, a web browser retrieves the set of instructions from the first server such that the associated elements remain un-retrieved by the web browser, and identifies a first set of links that links the first set of data to one another. The web browser then displays an overview, which includes a representation of the first set of data, using, for example, icons.

Furthermore, the web browser identifies a second set of links that links one or more of the first set of data to a second set of data that resides on a second server, identifies electronic mail addresses that are included in the first set of data, and identifies the last modification dates associated with the first set of data. In addition, the web browser displays a listing of the first set of data organized according to the identified last modification dates, and a listing of the identified second set of links and the identified electronic mail addresses.

Methods and systems consistent with the present invention have several advantages over the prior art. For example, by providing an overview of webpages and related information residing on a website, such methods and systems can rapidly display the entire structure of the website. From a displayed overview, a user can directly bring up a desired webpage without first having to sequentially bring up several webpages in order to reach the desired webpage, and thus, facilitating website navigation. Furthermore, such methods and systems can display in a consistent and uniform manner the structure of websites and related information stored in the websites regardless of the specific design and structure of each website. In addition, such methods and systems can display, in compressed form, information retrieved from a website on Java enabled devices and hand-held or mobile devices, for example portable phones or other mobile communication devices, all of which typically have relatively small displays and cannot display information commonly viewed on larger displays, such as a computer terminal.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

BRIEF DESCRIPTION OF THE DRAWINGS

In the Figures:

FIG. 10 shows a listing of website contents and electronic mail addresses in accordance with an embodiment of the invention.

BEST MODE FOR CARRYING OUT THE INVENTION

The following description refers to the accompanying drawings. Where appropriate, the same reference numbers in different drawings refer to the same or similar elements.

In accordance with an embodiment of the invention, a web browser program displays on a display device an overview of data, for example webpages and related information, residing on a website. The web browser retrieves a set of instructions and associated multimedia elements for displaying the webpages such that the multimedia elements remain un-retrieved by the web browser, identifies internal links that link the webpages to one another, and displays an overview of the webpages and related information that includes, for example, a hierarchical representation of the webpages. Furthermore, the web browser identifies external links that link the webpages to other websites, identifies electronic mail addresses that are included in the website, and identifies the last modification dates associated with the webpages that reside on the website. In addition, the web browser displays a listing of the webpages organized according to the identified last modification dates, and displays a listing of the identified external links and electronic mail addresses.

Figure 1:
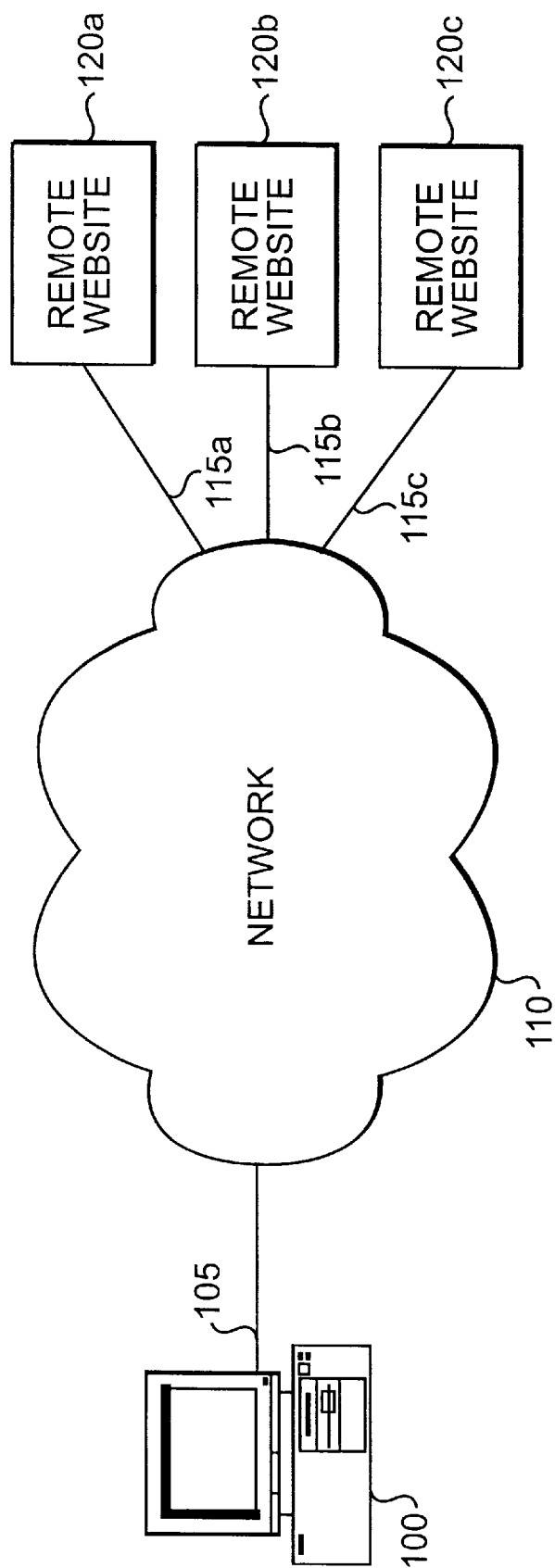
FIG. 1 shows a block diagram of external interfaces of a user device in accordance with an embodiment of the invention.

FIG. 1 shows a block diagram of the external interfaces of a user device 100 in accordance with an embodiment of the invention. Device 100 communicates with remote websites 120a–c via network 110. Device 100 may, for example, include any type of computer, Java device, and/or hand-held device such as a portable phone or any other mobile communications device. Network 110 transports data and video in the form of packets between device 100 and remote websites 120a–c, using, for example, the Transmission Control Protocol (TCP).

Figure 2:
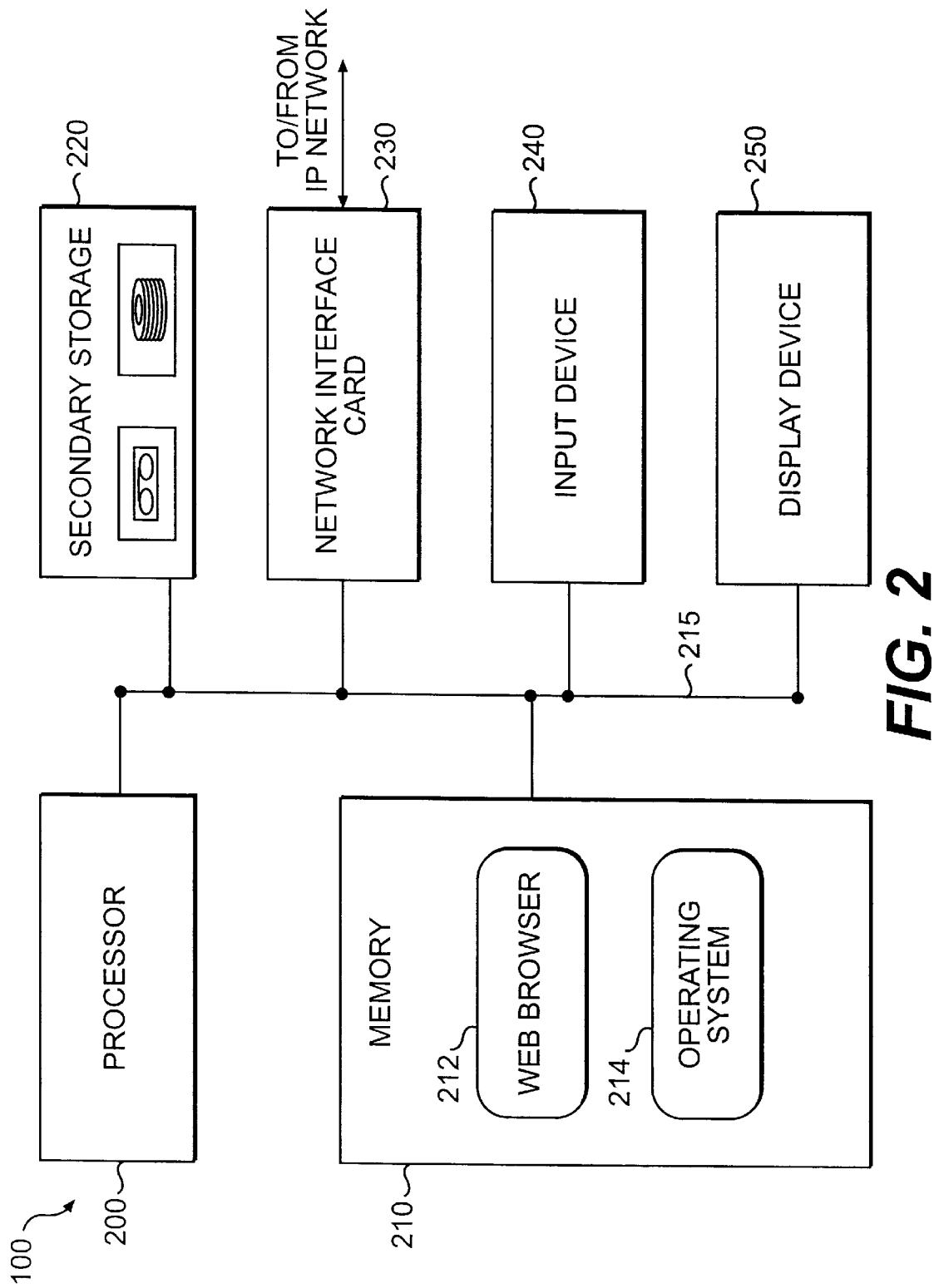
FIG. 2 shows an internal block diagram of a user device in accordance with an embodiment of the invention.

FIG. 2 shows an internal block diagram of device 100 in accordance with an embodiment of the invention. Device 100 includes processor 200 which is connected via bus 215 to memory 210, secondary storage 220, network interface card 230, input device 240, and display device 250. In one embodiment, processor 210 and memory 210 may, for example, include a 200 MHZ Pentium™ processor and a 32 MBytes random access memory (RAM), respectively. One of ordinary skill in the art will appreciate that many different configurations of similar components are possible, as FIG. 2 shows one example of such configurations.

Memory 210 includes a web browser program 212 and an operating system 214, both of which include instructions that processor 200 executes. Web browser 212 establishes a TCP connection with, for example, remote website 120a, and uses the Hypertext Transfer Protocol (HTTP) to retrieve, for example, Hypertext Markup Language (HTML) files from remote website 120a and displaying the retrieved files on display device 250. Alternatively, web browser 212 may use other transfer protocols to retrieve any markup language files, for example Extensive Markup Language (EML), from remote website 120a. Operating system 214 may include Windows NT® operating system developed by Microsoft Corporation.

Secondary storage 220 comprises a computer readable medium such as a disk drive and/or a tape drive. From the tape drive, software and data may be loaded onto the disk drive, which can then be copied into memory 210. Similarly, software and data in memory 210 may be copied onto the disk drive, which can then be loaded onto the tape drive.

Network interface card 230, which interfaces with network 110, includes a processor and memory for transmitting packets to and receiving packets from network 110 via a TCP connection. Input device 240 includes a keyboard, and in addition, may also include a mouse driver (not shown) for receiving user input via position of a mouse cursor on display device 250, which may include a video monitor.

Figure 3:
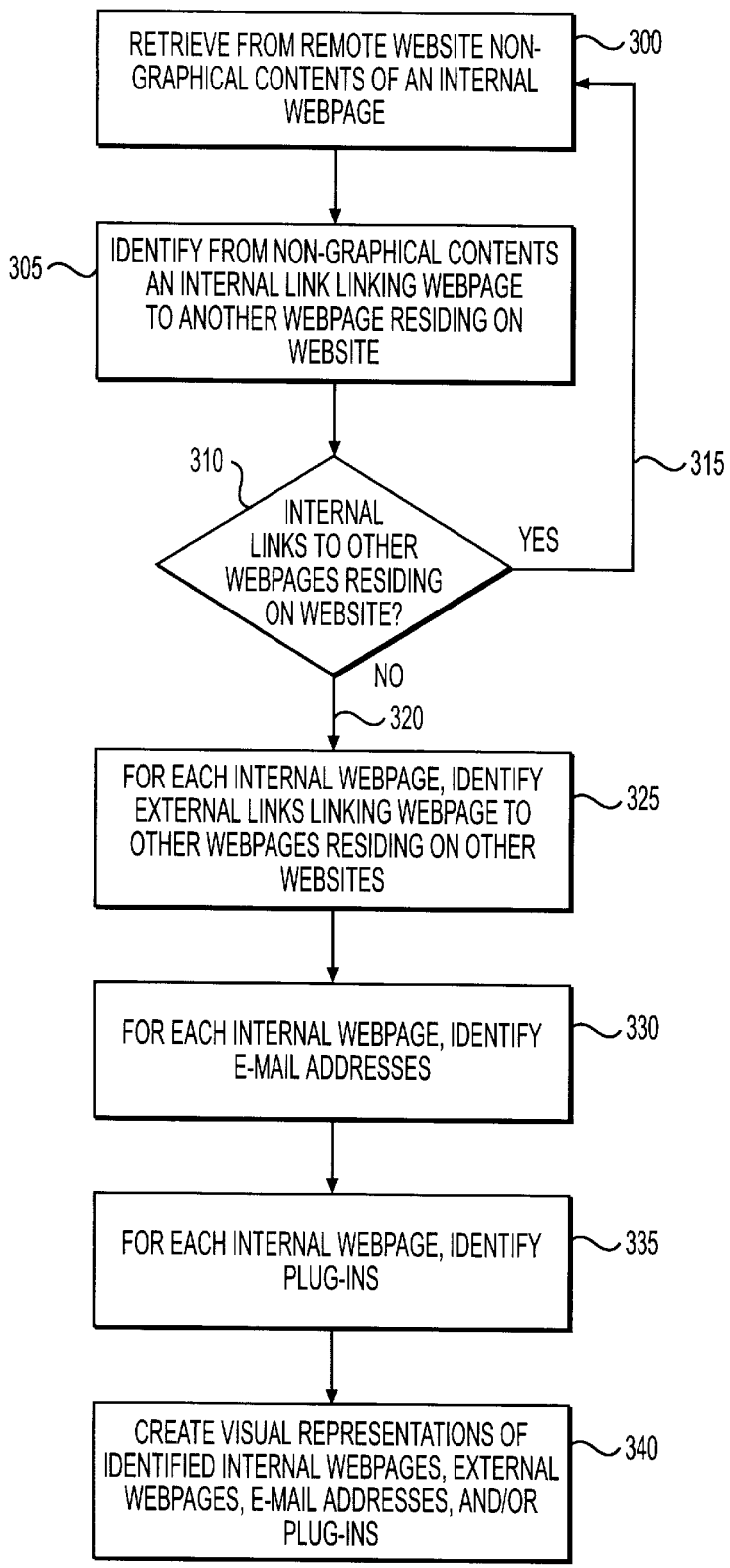
FIG. 3 is a flow chart of the steps performed by a web browser in a user device in accordance with an embodiment of the invention.

FIG. 3 is a flow chart of the steps performed by web browser 212 in accordance with an embodiment of the invention. After establishing a TCP connection via network interface card 230 to remote website 120a, web browser 212 retrieves from remote website 120a an HTML file, which is associated with, for example, the home page of remote website 120a (step 300). Specifically, web browser 212 stores the retrieved HTML file in memory 210, and parses the retrieved HTML file without retrieving from remote website 120a the multimedia elements, for example Java Applets, graphic files, audio files, movie files, and/or any other types of files, associated with <IMG> tags in the HTML file. In other words, web browser 212 does not download from remote website 120a onto device 100, for example, the ".gif" and/or ".mpg" files that are referenced in the retrieved HTML file.

When parsing the retrieved HTML file, web browser 212 identifies one or more internal links linking the HTML file to one or more other HTML files residing on remote website 120a (step 305). Web browser 212 identifies the internal links to HTML files residing on remote website 120a by, for example, parsing the retrieved HTML file for an appropriate tag, for example an <HREF> tag. If an <HREF> tag does not include the term "http://," web browser 212 determines that the <HREF> tag identifies an internal link to an HTML file residing in remote web site 120a.

Web browser 212 then determines whether there are additional internal links in the retrieved HTML file (step 310). For each identified internal link (step 315), web browser 212 retrieves from remote website 120a the internal HTML file associated with the identified internal link (step 300) by repeating steps 300 through step 310.

When web browser 212 determines that there are no more internal links in the retrieved HTML files (step 320), for each retrieved HTML file, web browser 212 identifies external links that link the retrieved HTML file to one or more external HTML files residing on other websites, for example, websites 120b and 120c (step 325). Furthermore, for each retrieved HTML file, web browser 212 also identifies any electronic mail addresses (step 330) and/or plug-ins (step 335), which may be included in the HTML file.

Figure 4B:
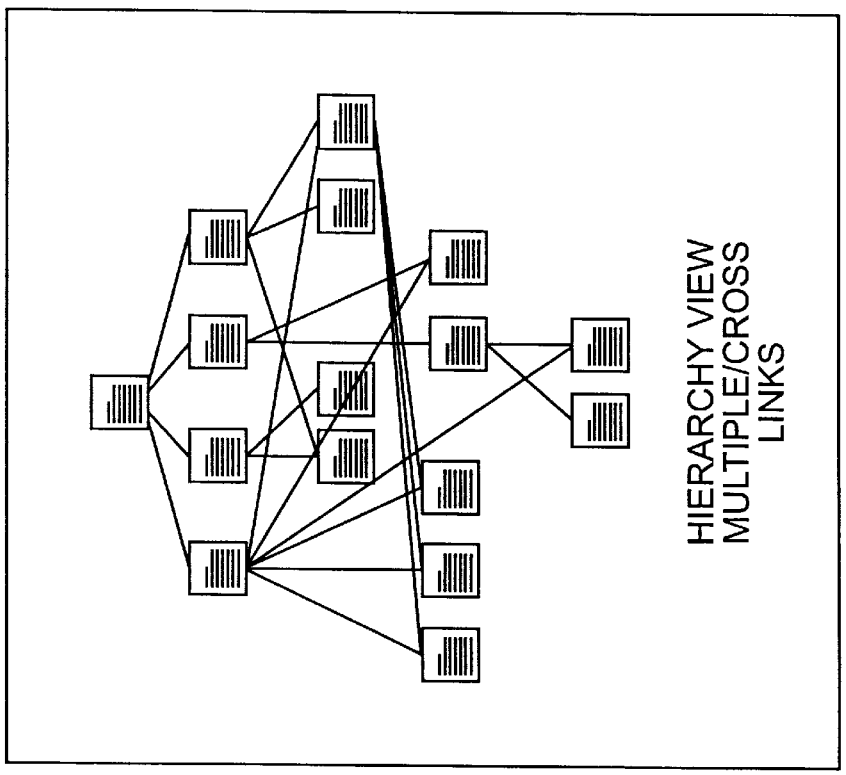
FIGS. 4a and 4b show hierarchical representation of webpages in a website in accordance with an embodiment of the invention.
Figure 4A:
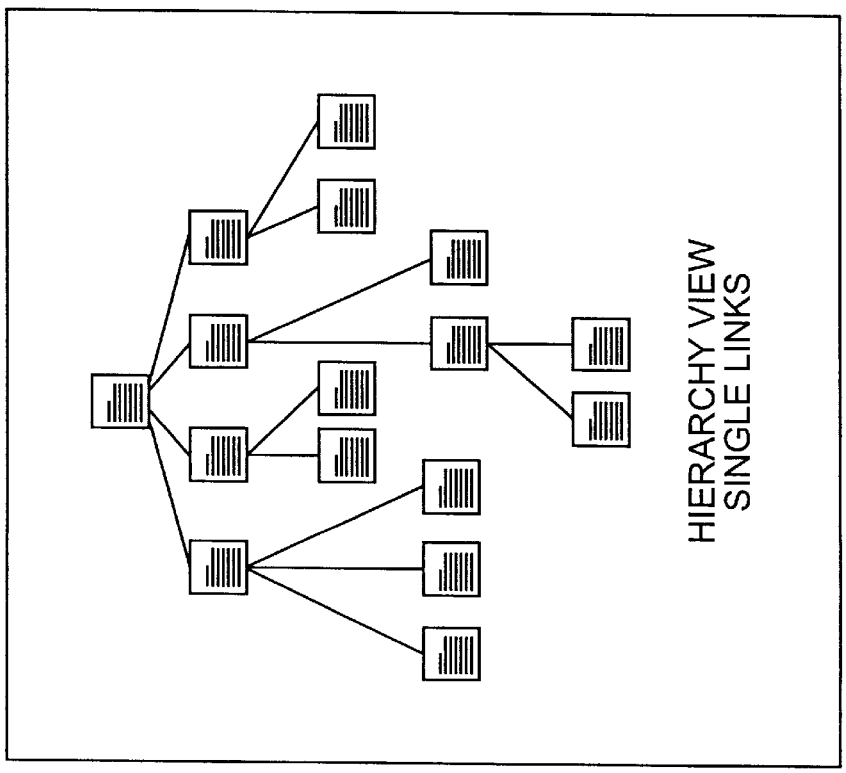

Finally, web browser 212 creates a visual representation of the webpages associated with the retrieved HTML files, identified external links, identified electronic mail addresses, and/or the identified plug-ins (step 340). In the embodiment shown in FIG. 4a, web browser 212 may display on display device 250 a hierarchical representation of the webpages. Web browser 212 represents the webpages as, for example, square icons which are connected to each other via lines. In this embodiment, web browser 212 displays only a single link to each webpage. Alternatively, as shown in the embodiment of FIG. 4b, web browser 212 may display more than one internal link to a webpage. Each internal link shown in FIG. 4b may also be referred to as a cross-link.

Figure 5B:
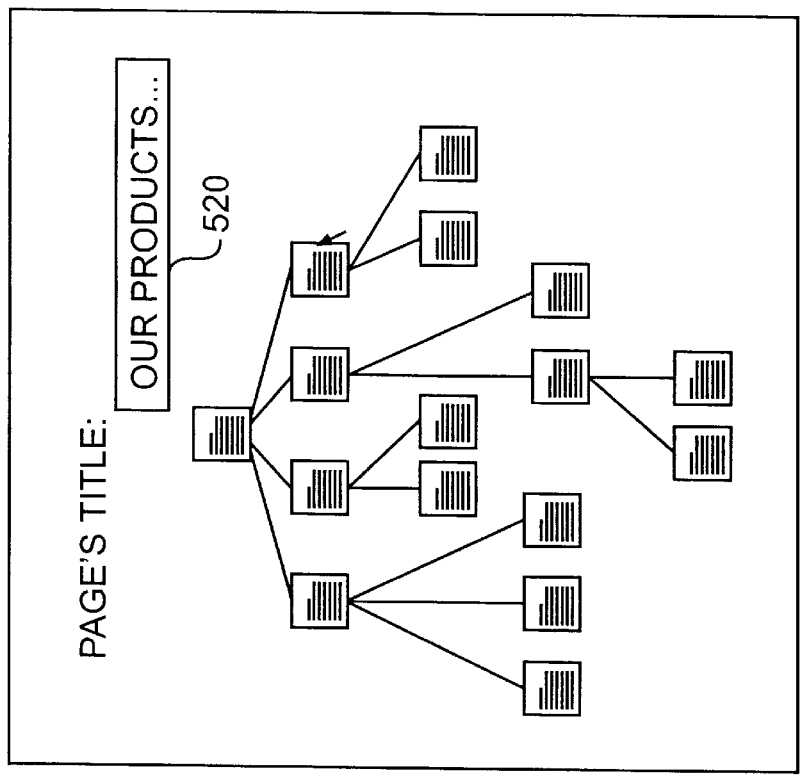
FIGS. 5a and 5b illustrate hierarchical representations of webpages that include webpage titles in accordance with an embodiment of the invention.
Figure 5A:
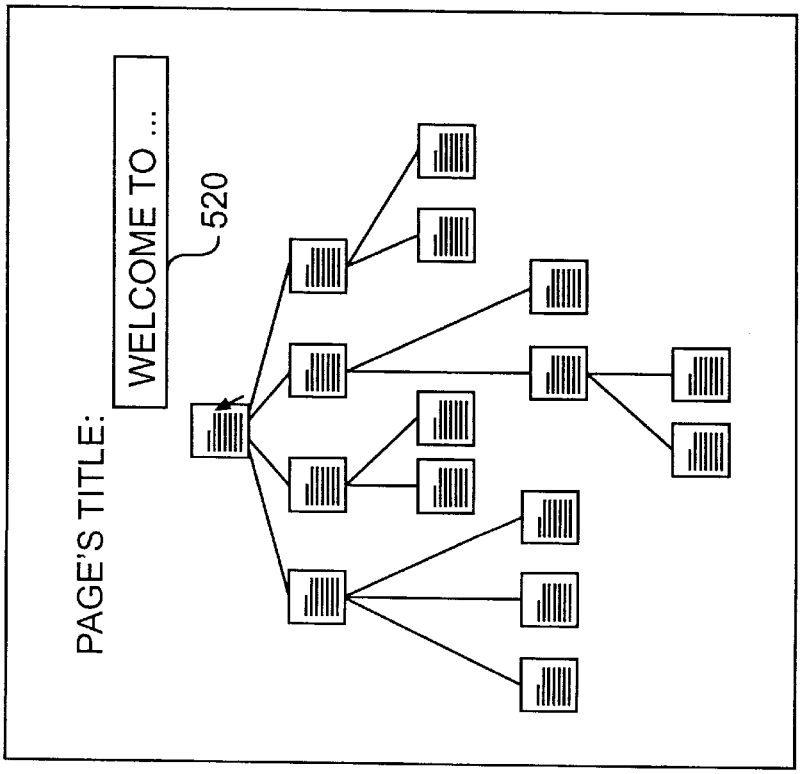
Figure 6:
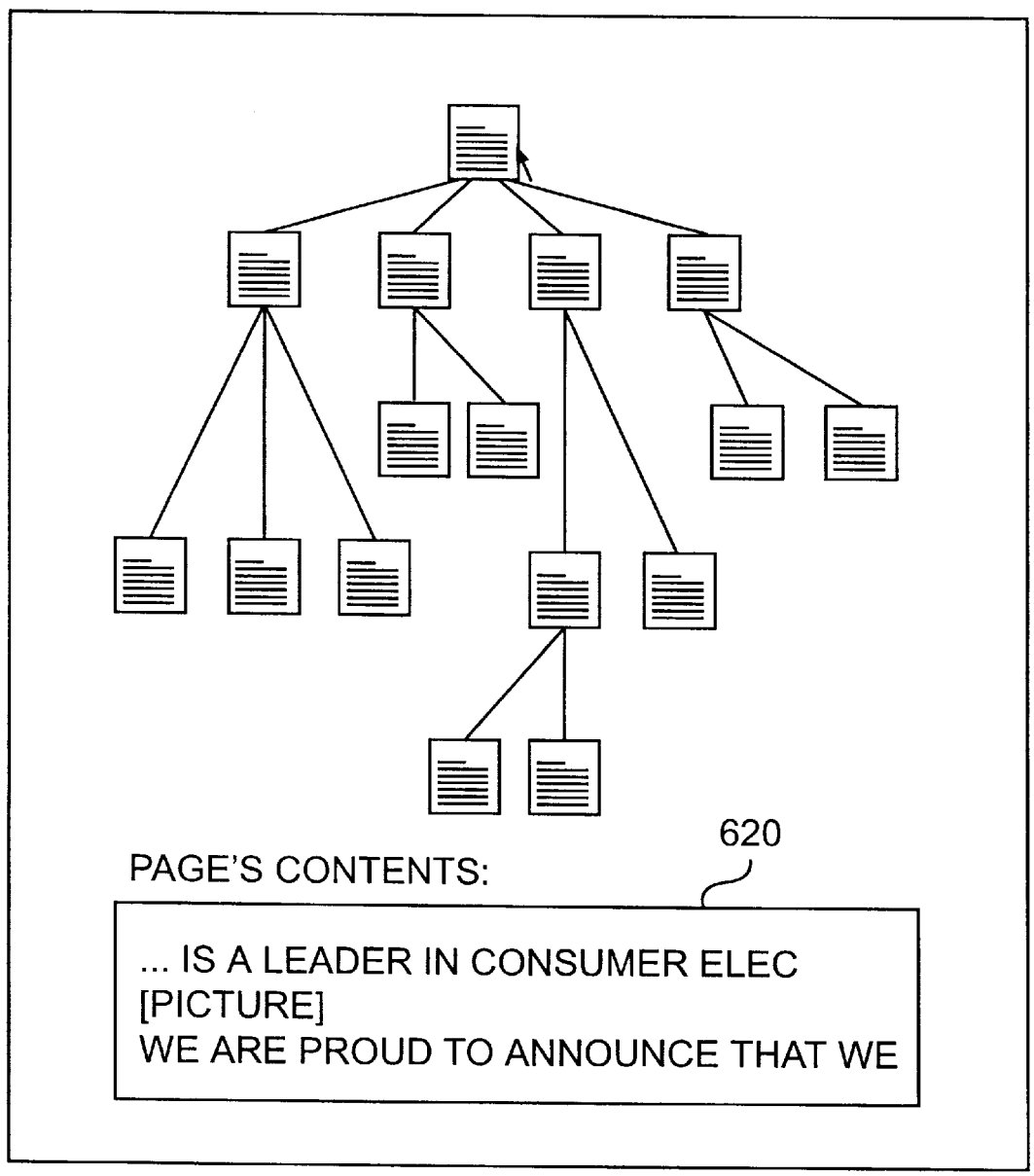
FIG. 6 illustrates a hierarchical representation of webpages that include webpage contents in accordance with an embodiment of the invention.

As shown in FIG. 5a and 5b, when a user positions the mouse cursor of input device 240 on an icon, which is displayed on display device 250, web browser 212 displays in display box 520 the title of the webpage associated with that icon. Web browser 212 identifies the title from the retrieved HTML file associated with the webpage by, for example, parsing the HTML file for an appropriate tag, for example a <TITLE> tag, and displaying the text that follows that tag. Alternatively, as shown in FIG. 6, when a user positions the mouse cursor of input device 240 on an icon displayed on display device 250, web browser 212 displays in display box 620 the text of the webpage that corresponds to that icon.

Figure 7:
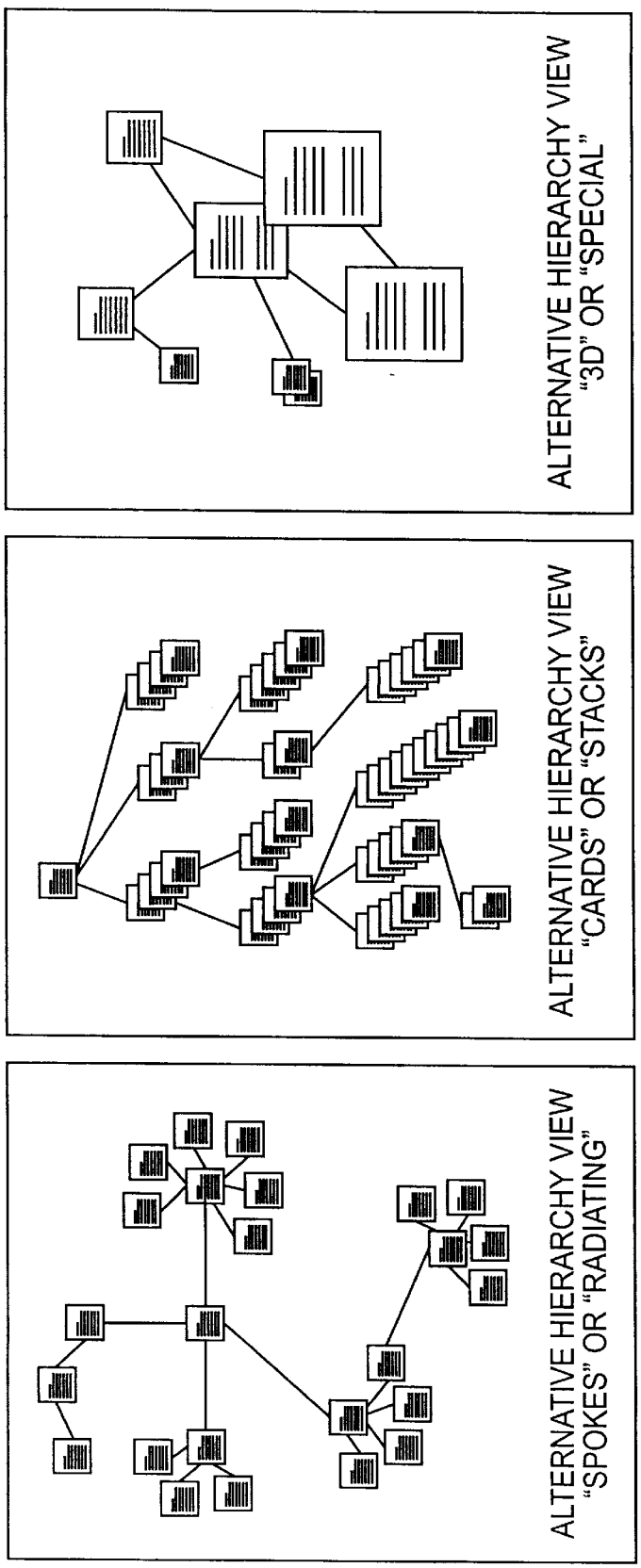
FIGS. 7a, 7b, and 7c illustrate additional hierarchical representations of webpages in a website in accordance with an embodiment of the invention.
Figure 8:
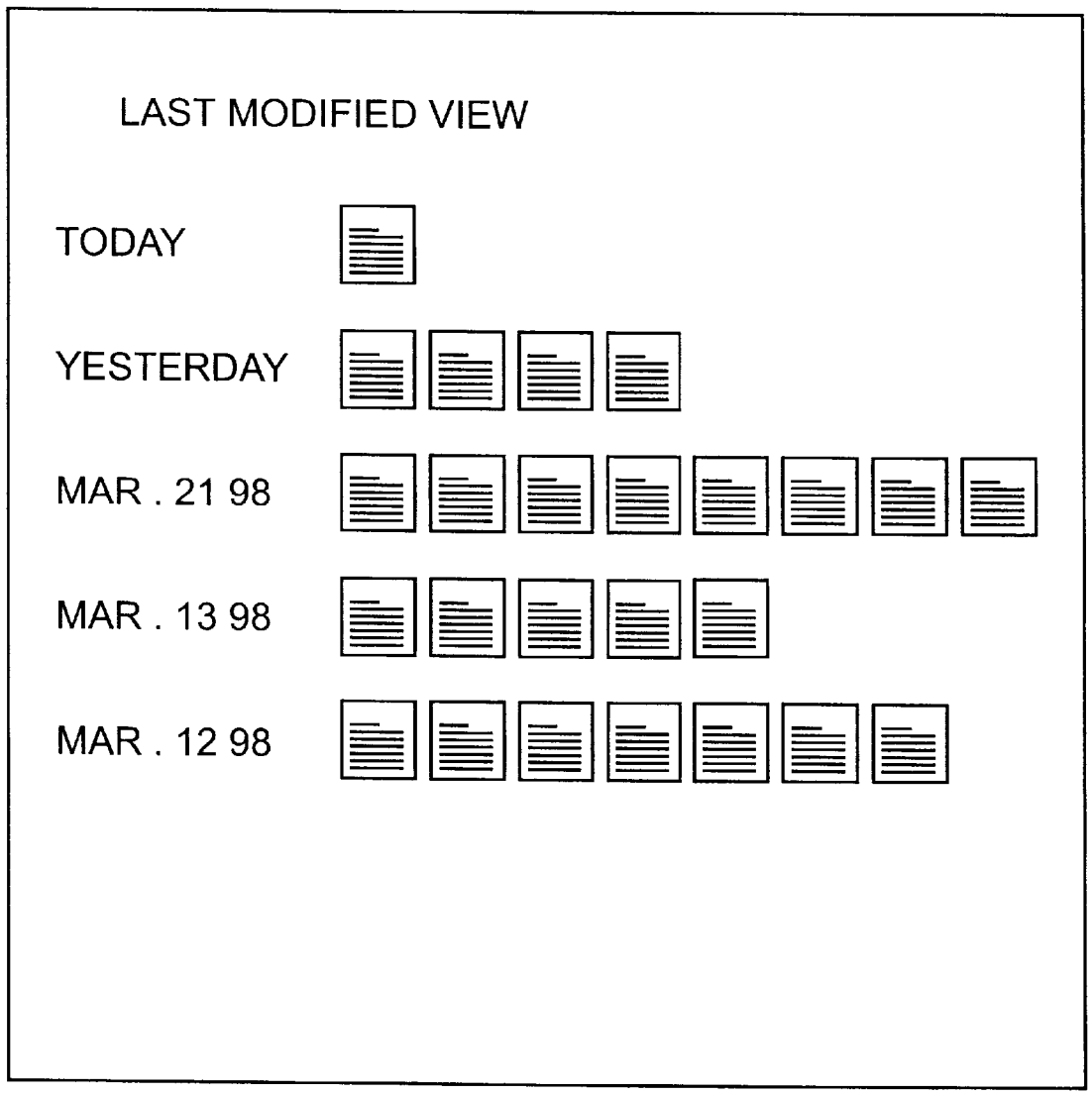
FIG. 8 shows a last date modified representation of webpages in a website in accordance with an embodiment of the invention.

In accordance with another embodiment, web browser 212 may display the hierarchy of the webpages associated with the retrieved HTML files as spokes, stacks, and/or three dimensional icons as shown in FIGS. 7a, 7b, and 7c, respectively. In addition, web browser 212 may display each icon in descending order based on a particular date-time criterion, for example last date-time of modification of or access to each webpage, as shown in FIG. 8. Alternatively, web browser 212 may display each icon in ascending order, random order, or no order at all.

Figure 9:
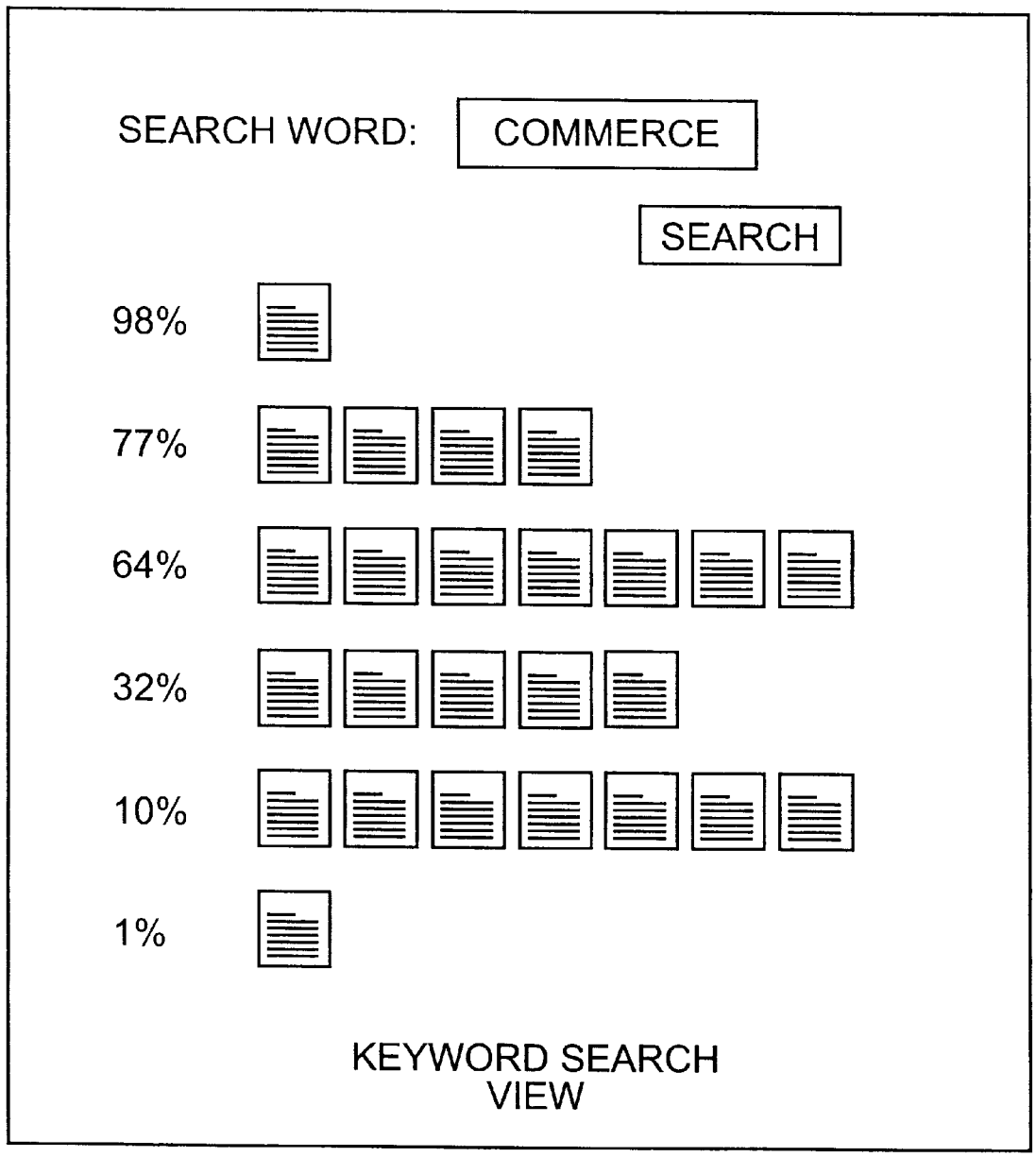
FIG. 9 shows a key word search listing of webpages in a website in accordance with an embodiment of the invention.

In accordance with yet another embodiment, when a user inputs a key word via input device 240, web browser 212 parses the retrieved HTML files for the occurrence of the key word, and displays a listing of the webpages associated with the HTML files, for example as icons, in descending order of the number of occurrences of the key word in each HTML file as shown in FIG. 9. Alternatively, web browser 212 may display each icon in ascending order, random order, or no order at all.

In addition, as shown in FIG. 10, as web browser 212 parses each retrieved HTML file, web browser 212 may identify and display on display device 250 the electronic mail addresses, the number of external links to other websites, the number of multimedia elements, and the number of webpages that reside in remote website 120a.

It will be understood by those skilled in the art that various changes and modifications may be made to the disclosed implementations, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. A method for use in a device for displaying an overview of data that resides on a server, wherein the server includes a set of instructions and associated elements for displaying the data, said method comprising the steps of:

retrieving, at the device, the set of instructions for displaying a first portion of the data such that the associated elements remain un-retrieved by the device;

identifying a hyperlink that links the first portion of the data to a second portion of the data; and displaying an overview that includes a representation of the first and the second portions of the data.

2. A method for use in a device for displaying an overview of data that resides on a server, wherein the server includes a set of instructions and associated multimedia elements for displaying a first portion of the data, said method comprising the steps of:

retrieving, at the device, the set of instructions such that the associated multimedia elements remain un-retrieved by the device;

identifying a hyperlink that links the first portion of the data to a second portion of the data; and displaying an overview that includes a representation of the first and the second portions of the data.

3. A method for use in a device for displaying an overview of a first set of data that resides on a first server, wherein the first server includes a set of instructions and associated multimedia elements for displaying the first set of data, said method comprising the steps of:

retrieving, at the device, the set of instructions such that the associated multimedia elements remain un-retrieved by the device;

identifying a first set of hyperlinks that links the first set of data together; and displaying an overview that includes a representation of the first data.

4. The method of claim 3 further comprising the steps of:

identifying a second set of hyperlinks that links the first set of data to a second set of data residing on a second server; and displaying a listing of the identified second set of hyperlinks.

5. The method of claim 3 further comprising the steps of:

identifying electronic mail addresses that are included in the first set of data; and displaying a listing of the identified electronic mail addresses.

6. The method of claim 3 further comprising the steps of:

identifying date-time information associated with the first set of data, respectively; and displaying a listing of the first set of data, wherein the listing is organized according to the identified date-time information.

7. The method of claim 3, wherein said displaying step comprises the step of:

representing the first set of data as icons connected via lines that correspond to the identified first set of hyperlinks, respectively.

8. The method of claim 3 further comprising the step of:

determining a first count of the identified first set of hyperlinks.

9. The method of claim 3, wherein said retrieving step comprises the step of:

retrieving, at the device, one or more Hypertext Markup Language (HTML) files from the first server, wherein each of the HTML files includes a subset of the set of instructions.

10. The method of claim 4 further comprising the steps of:

determining a second count of the identified second set of hyperlinks.

11. The method of claim 7 further comprising the step of:

displaying a title associated with one of the first set of data when a user places an input device cursor on an icon that corresponds to said one of the first set of data.

12. The method of claim 7 further comprising the step of:

displaying text associated with one of the first set of data when a user places an input device cursor on an icon that corresponds to said one of the first set of data.

13. The method of claim 8 further comprising the step of:

displaying the determined first count on a display device.

14. The method of claim 10 further comprising the step of:

displaying the determined second count on a display device.

15. A system for displaying an overview of data that resides on a server, wherein the server includes a set of instructions and associated elements for displaying a first portion of the data, said system comprising:

a memory comprising:

a web browser program for retrieving the set of instructions such that the associated elements remain un-retrieved, and identifying a hyperlink that links the first portion of the data to a second portion of the data, and displaying an overview that includes a representation of the first and the second portions of the data; and a processor for executing the web browser program.

16. A system for displaying an overview of a set of data that resides on a server, wherein the server includes a set of instructions and associated multimedia elements for displaying the set of data, said system comprising:

a memory comprising:

a web browser program for retrieving the set of instructions such that the associated multimedia elements remain un-retrieved, and identifying hyperlinks that link the set of data together, and displaying an overview that includes a representation of the set of data; and a processor for executing the web browser program.

17. A computer-readable medium capable of configuring a computer to perform a method for use in a device for displaying an overview of a set of data that resides on a server, wherein the server includes a set of instructions and associated elements for displaying the set of data, said method comprising the steps of:

retrieving, at the device, the set of instructions such that the associated elements remain un-retrieved by the device;

identifying hyperlinks that link the set of data together; and displaying an overview that includes a representation of the set of data.

* * * * *